United States Patent
Rheinheimer et al.

(10) Patent No.: US 6,502,674 B2
(45) Date of Patent: Jan. 7, 2003

(54) FRICTION ENGAGEMENT DEVICE

(75) Inventors: Gunter Rheinheimer, Wachenheim (DE); Viktor Reis, Mannheim (DE); Wolfram Elsner, Fellbach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/848,098

(22) Filed: May 3, 2001

(65) Prior Publication Data

US 2002/0162710 A1 Nov. 7, 2002

(51) Int. Cl.$^7$ ............................................. F16D 69/02
(52) U.S. Cl. .................... 188/251 M; 188/264 B; 188/251 A; 192/107 M
(58) Field of Search .................. 188/251 M, 251 A, 188/251 R, 73.1, 264 B, 218 XL, 249, 77 A, 259, 73.2; 192/107 M; 428/564

(56) References Cited

U.S. PATENT DOCUMENTS

| | | | |
|---|---|---|---|
| 3,005,259 A | 10/1961 | Benya et al. | 29/505 |
| 5,028,494 A | 7/1991 | Tsujimura et al. | 428/614 |
| 5,339,931 A | 8/1994 | Jacko et al. | 188/251 |

FOREIGN PATENT DOCUMENTS

| | | |
|---|---|---|
| DE | 689 10 209 | 10/1993 |
| DE | 42 43 516 | 6/1994 |
| DE | 695 14 405 | 11/1995 |
| DE | 196 44 835 | 5/1997 |
| DE | 694 03 791 | 6/1997 |
| DE | 196 08 952 | 9/1997 |
| DE | 10011018 | * 9/2001 |
| EP | 0 679 818 | 11/1995 |
| EP | 0 879 975 | 11/1998 |
| EP | 1132641 | * 9/2001 |
| JP | 11325137 | 11/1999 |

OTHER PUBLICATIONS

MIBA HM200E, Specification Sheet, dated Aug. 1990, 1 page.
http://www.kippo.or.jp/culture/washi/perform/index_e.htm, dated Feb. 20, 2001, 5 pages.
Motor Age: Brake lining Materials website, dated Feb. 19, 2001, 2 pages.
http:///www.nhc-brakes.com, dated Feb. 20, 2001, 4 pages.
http://www.wellmanfriction.com/fm.htm, dated Feb. 20, 2001, 4 pages.

* cited by examiner

Primary Examiner—Douglas C. Butler

(57) ABSTRACT

A brake or a clutch for motor vehicles having a first component (10) and a second component (16, 18), that can be moved relative to each other. The first component (10) has a contact surface of a low cost aluminum or aluminum alloy. The second component contains a support component (16) to which a friction lining (18) is applied which can be pressed against the contact surface. For a cost effective configuration that makes it possible to absorb high levels of brake energy with high durability together with a very good heat transfer from the friction contact zone, it is proposed that the friction lining (18) be of an organic material of predominately carbon compounds, in particular of paper. Furthermore it is advantageous that the first or the second component (10) rotate at least partially in a lubricant.

11 Claims, 3 Drawing Sheets

FRICTION ENGAGEMENT DEVICE

BACKGROUND AND SUMMARY OF THE INVENTION

The invention concerns a friction engagement device, in particular a brake or a clutch for motor vehicles. The friction engagement device contains at least one first component and at least one second component, that can move relative to each other, in that, as a rule, one of the components rotates and the other component remains at rest. The first component is provided with at least one contact surface and consists, at least in its region bordering on the contact surface, of a material with high heat conductivity, such as aluminum or an aluminum alloy. The second component contains a support component to which at least one friction lining is applied with adhesive, riveting or the like. In order to perform a friction engagement for braking or engaging a clutch, the friction surface of the friction lining can be pressed against the contact surface.

The rapid removal of heat from the region of friction contact during the deceleration (braking, clutch engagement) is critically important for the durability and load capacity of a brake or clutch of a motor vehicle, for example, a tractor or passenger vehicle, in order to keep the peak temperature below a specific critical temperature at which the brake or clutch could be damaged and lose its effectiveness or even fail completely.

Due to increasing operating speeds, particularly in the case of tractors, ever greater amounts of braking energy are applied to service and auxiliary brakes in the form of heat. In view of the increasing load density and the associated temperature problems, the durability of the components, particularly the brake lining, is increasingly endangered or its life reduced.

Commonly steel or cast iron are applied in brakes as opposing material to the friction linings of brake bands or opposing disks. This leads to poor heat flow from the friction contact zone and to great weight which is largely undesirable, in particular in future light-weight vehicle concepts.

Beyond that, multi-component brake drums are known, in which a friction ring as a separate component is fastened, fixed against rotation, to the radially inner side of a pot-shaped brake drum. In that way US-A-3,005,259 discloses a brake drum of aluminum with a friction ring of a cast iron material, where the friction ring is fastened to the brake drum, fixed against rotation, by means of radial undercuts. For reasons of weight reduction the brake drum is made of aluminum. But the friction ring consists of a cast iron material and cannot guarantee a rapid flow of heat from the friction contact surface.

EP-A-0 879 975 describes a brake drum component group, consisting of a pot-shaped brake drum of aluminum, that is fastened, fixed against rotation, to the hub of a vehicle axle, as well as a friction ring of metal matrix composite material (MMC) fastened, fixed against rotation, to the brake drum. Due to the MMC material these brake drum component groups enjoy a very high load capacity and thermal resistance. Since the brake drum consists of aluminum it also provides advantages in weight reduction. Due to the use of the MMC material, however, these brake drum component groups are very costly and complicated to manufacture.

Furthermore DE-A-42 43 516 describes a brake lining for brakes with aluminum brake disks. In order to avoid strength problems in the aluminum brake disks at temperatures above 450° C., the friction material is to be selected in such a way that its friction coefficient remains constant up to a temperature of 400° C., and declines at higher temperatures. However, brakes of this configuration are recommended only for relatively low braking forces.

U.S. Pat. No. 5,339,931 describes a friction material made of phenolic resin; an organic friction modifier such as rubber scrap, cellulose, latex, cork, or cashew particles; an aramid fiber; a carbonaceous material such as graphite, synthetic graphite, carbon and coke; glass fiber; inorganic friction modifiers such as barytes, whiting, talc, rottenstone, vermiculite or suzorite mica; abrasive particles such as silica, magnesia, zircon, zirconia, mullite, alumina or iron oxides; a lubricant, and 2–18 percent porous copper powder. This friction material is specially formulated for use with aluminum metal matrix composites and can operate at temperatures that approach 450° C.

The problem underlying the invention is seen as that of defining a friction engagement device of the type defined above, that is able to absorb high braking energy levels, exhibits high durability life together with very good heat conductivity out of the friction contact zone, can be manufactured cost effectively and is sufficiently rigid to absorb and transmit high forces and torques.

It has been found, in particular for friction engagement devices in which high energy levels are encountered, that the combination of aluminum or aluminum alloy contact surfaces on the one hand, with friction linings of an organic material on the other hand, can fulfill the requirements imposed. The power level absorbed by the friction engagement device can be increased considerably compared to previous devices. On the one hand, the increase in the peak temperature in the friction contact zone is reduced by approximately 30% by the use of aluminum or an aluminum alloy in place of the otherwise usual materials such as steel and cast iron. Thereby the friction engagement device can absorb a higher load during a friction engagement, for example, during braking, or its durability is clearly increased at a given load. This permits a limited-time durability to be converted into a long-term durability. On the other hand, cost effective but temperature sensitive organic materials that could burn in the case of poor heat conduction can be applied without their susceptibility to high temperature being detrimental. Increased size friction contact surfaces and a resulting larger space requirement and increased weight for the friction engagement device can be avoided.

Heavy, high speed utility vehicles, particularly agricultural tractors, that are being designed for vehicle speeds of 50 km/h and above, require powerful brakes. As a rule, generally there is only a relatively small space available for this purpose, so that the brakes must be designed for high power densities. For example, with such tractors the parking brake (hand brake) should not exceed an average thermal density of 3 W/mm$^2$. In the case of the service brake (foot brake) this value is closer to 1 W/mm$^2$. These values can be exceeded with a friction engagement device according to the invention.

As used herein for the present invention, the friction material is predominantly made of carbon based compounds. A preferred formulation uses mainly cellulosic fibers mixed with synthetic thermally stable fibers such as Kevlar™ or graphite fibers bound in a resin. For reasons of cost, it is advantageous to generally use paper linings for friction linings. For example, a friction lining of the type HM200E of the company Miba, Austria, is appropriate for a high static and dynamic friction value. The friction coefficient of the friction lining is appropriately greater than 0.1.

In dry brakes, as a rule, abraded material of the lining appears in the contact zone. The abraded material can become embedded in the friction contact surface, particularly in the aluminum surface, and increase its roughness, which can lead to increased wear and finally to the destruction of the friction surface and the friction lining. According to a particularly preferred further development of the invention, these wear phenomena can be effectively avoided by immersing the rotating first or second component at least partially in a lubricating oil sump, so that the friction surface is moistened constantly.

The lubricant here preferably is a lubricating oil, particularly a usual hydraulic oil, a brake oil or a gear oil. Many vehicles already contain lubricant circulating systems. The lubrication of the friction engagement device can be incorporated into these circulating systems to great advantage. It is appropriate that the lubricant conducted in a circulating system also be cooled in the usual manner.

According to a further preferred embodiment of the invention, an aluminum alloy is applied here with a thermal conductivity that is greater than 120 W/m°K, preferably greater than 150 W/m°K. The aluminum alloy preferably contains between 5–14% silicon and between 0–5% copper. For example, an appropriate aluminum alloy is AlSi9Cu3 where the thermal conductivity is greater than that of the usual iron brake components and guarantees a rapid heat flux away from the friction surface.

Particularly with friction engagement devices that are run dry, it may be advantageous to subject the contact surface (friction surface) that consists of aluminum or an aluminum alloy of the first component to a surface treatment by hard anodizing. Thereby the surface is strengthened within one layer, in a thickness of a few $\mu$m, so that in any case the lining wears, but not the aluminum contact surface.

With friction engagement devices that are operated wet, this measure can usually be omitted.

It is particularly advantageous to apply the solution according to the invention to brakes with brake drums, where the first component that consists of aluminum or an aluminum alloy is the brake drum. This brake may be an auxiliary brake (hand brake) that is used for an emergency retarding of the vehicle and for its parking. Here a brake band, which carries the friction lining of organic material, is slung about the brake drum with its good heat conductivity. The brake drum is arranged in a housing which is partially filled with gear oil so that the brake drum is running in oil and the friction surface is constantly moistened.

Since the layers of material located closest to the friction contact zone are generally, critical to the rapid transfer of heat, the brake drum can be configured as a (two-piece) composite component, in that the supporting structure is manufactured of steel or cast iron that is paired, fixed against rotation, with a friction element (friction ring) of aluminum. Thereby the strength and cost advantages of steel/cast iron as opposed to aluminum or aluminum alloy can be utilized in connection with the better heat transfer of the aluminum materials. The friction lining in the brake band consists of organic material, for example, paper.

A further, particularly preferred area of application is the service brake. Here the second component is a rotating full brake disk, that carries at least one brake lining on both sides in its radially outer region. The brake disks are associated with metal rings arranged, fixed against rotation, of which at least one can be moved axially in order to establish the friction engagement with the brake linings. The metal rings consist of aluminum or an aluminum alloy.

The invention can be applied analogously in place of a service brake configured as a disk brake, also as a multiple-disk brake or a multiple-disk clutch.

The drawing shows embodiments of the invention on the basis of which the invention as well as further advantages and advantageous further developments and embodiments of the invention shall be explained and described in greater detail in the following.

DETAILED DESCRIPTION OF THE INVENTION

Figure 1:
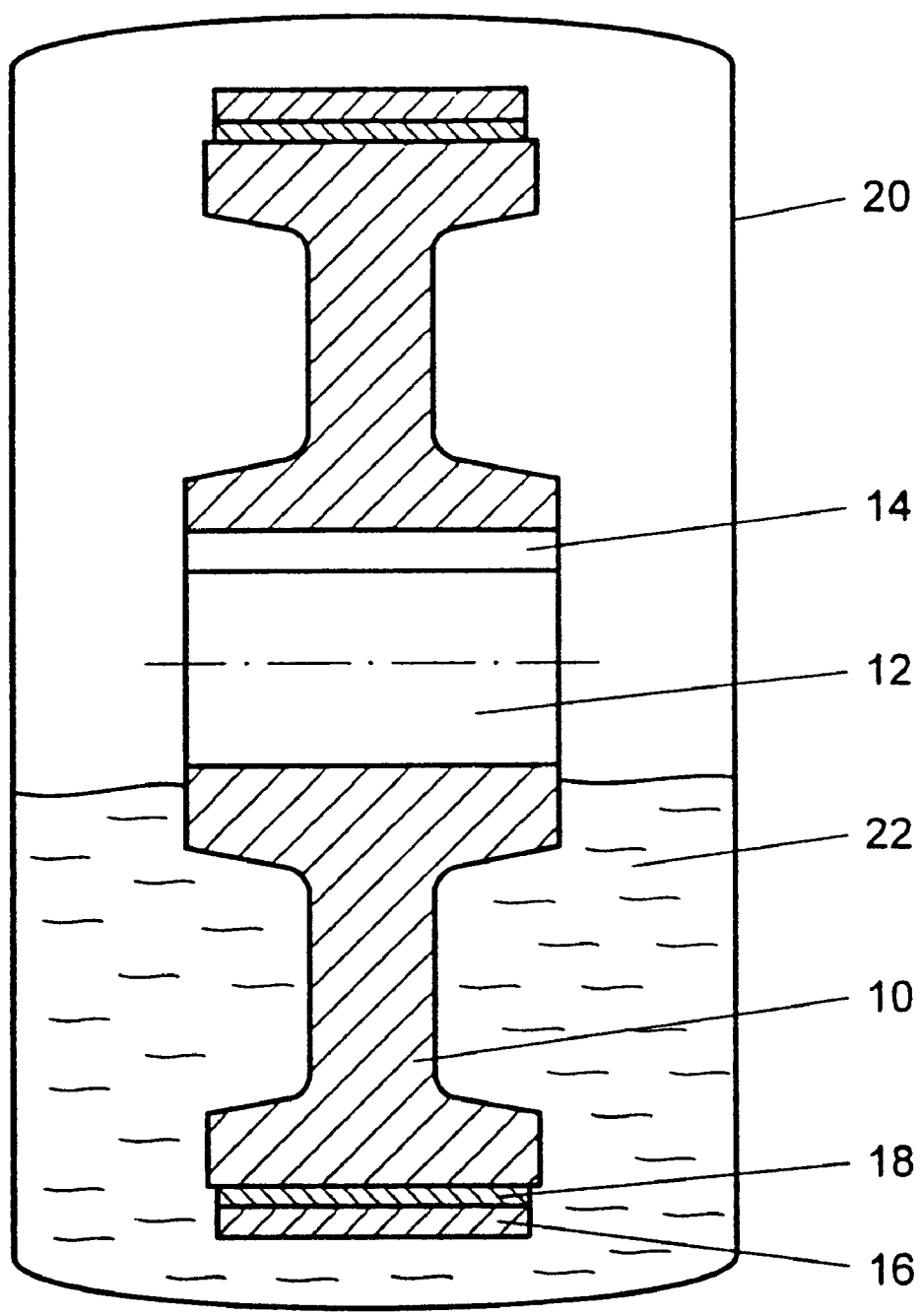
FIG. 1 shows a cross sectional representation of a complete parking brake configured according to the invention.

FIG. 1 discloses a parking brake with a brake drum 10. The brake drum 10 is manufactured from the aluminum alloy AlSi9Cu3 (9% silicon, 3% copper) for good heat conductivity. This alloy is relatively inexpensive, thus avoiding the high cost of an aluminum MM as used in the prior art described above. As used herein to describe and claim the invention, "aluminum alloy" does not include an aluminum MMC but is limited conventional aluminum alloys such as AlSi9Cu3. While several aluminum alloys may be used, it is. preferred to use an alloy containing between 5–14% silicon and between 0–5% copper. The drum 10 contains a central bore 12 with a groove 14, that is used for the mounting, fixed against rotation, on a rotating shaft of a vehicle driveline, not shown in any further detail. A brake band 16 is slung in the usual manner about the cylindrical circumferential surface of the brake drum, the brake band consists of steel, its ends are fixed and do not rotate with the brake drum 10.

On the inner side of the brake band 16 facing the brake drum 10, an organic friction lining 18 is fastened which consists of paper and is made of predominately organic compounds. This is the lining HM200E from the company Miba, Austria. This lining is made primarily of cellulosic fibers and synthetic thermally stable fibers, such as Kevlaror™ graphite, bound in a resin. The brake drum 10 is located in a housing 20 that is partially filled with a hydraulic oil 22. The hydraulic oil 22 is pumped and circulates in an oil circuit that contains an oil cooler, among other components, the oil moistens the circumferential surface of the brake drum 10.

To apply the brake, tension is applied to the brake band 16 so that it is tightly in contact with the circumferential surface of the drum and the friction lining 18 is pressed against the circumferential surface of the drum that is configured as contact surface. Due to the friction engagement between the brake lining 18 that is at rest and the rotating cylindrical brake drum (10) the latter is braked.

Figure 2:
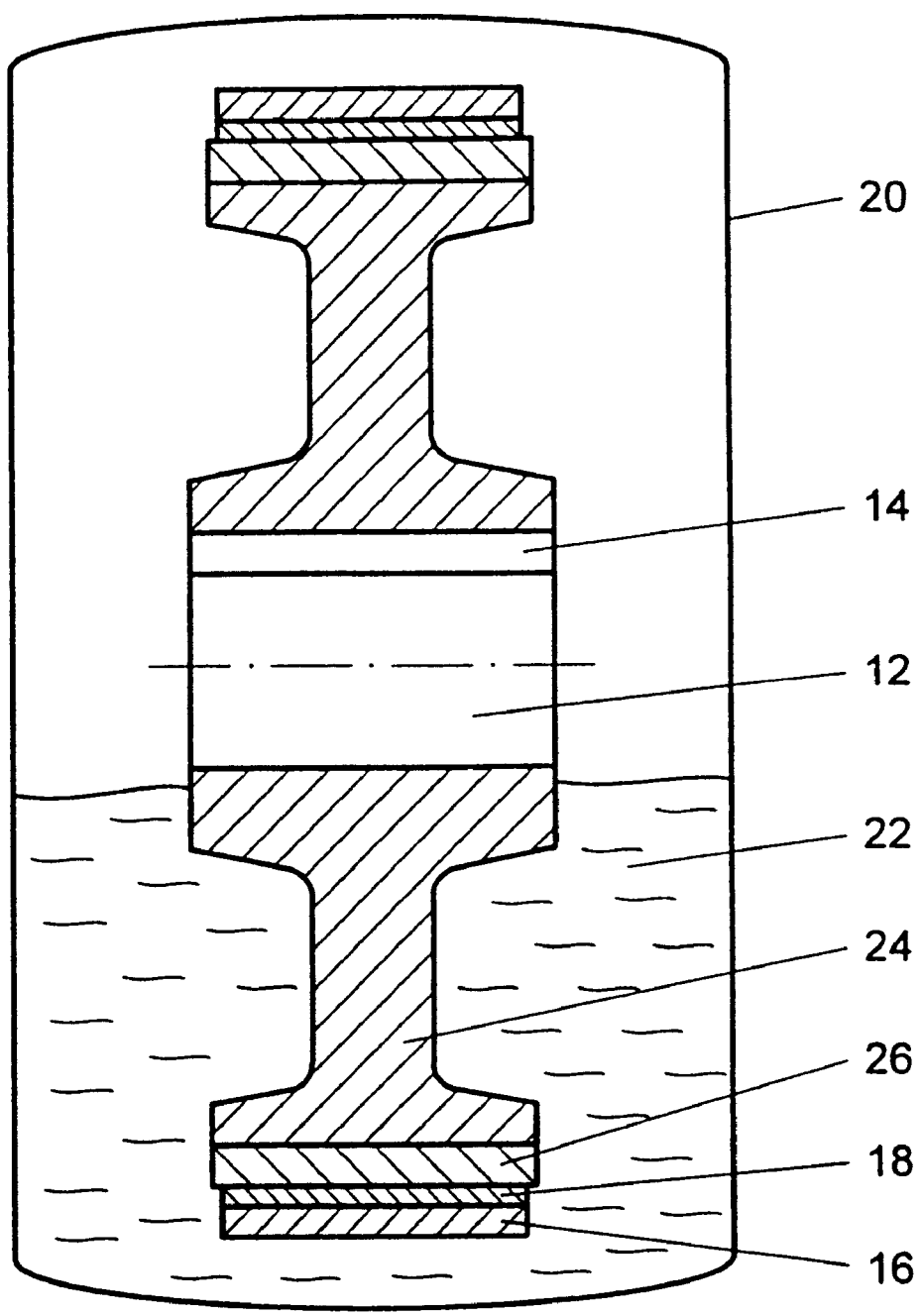
FIG. 2 shows a cross sectional representation of a further parking brake configured according to the! invention.

The parking brake shown in FIG. 2 differs from the brake shown in FIG. 1 only in regard to the brake drum. In FIGS. 1 and 2 identical components are indicated by the same reference number. According to FIG. 2 the brake drum is configured as a two-piece composite component, in which the radially inner supporting structure 24 is manufactured from steel: or cast iron. A ring 26 of aluminum alloy is pressed and connected, fixed against rotation, onto the cylindrical circumferential surface of the supporting structure 24. The outer contact surface of the ring interacts with the friction lining 18.

Figure 3:
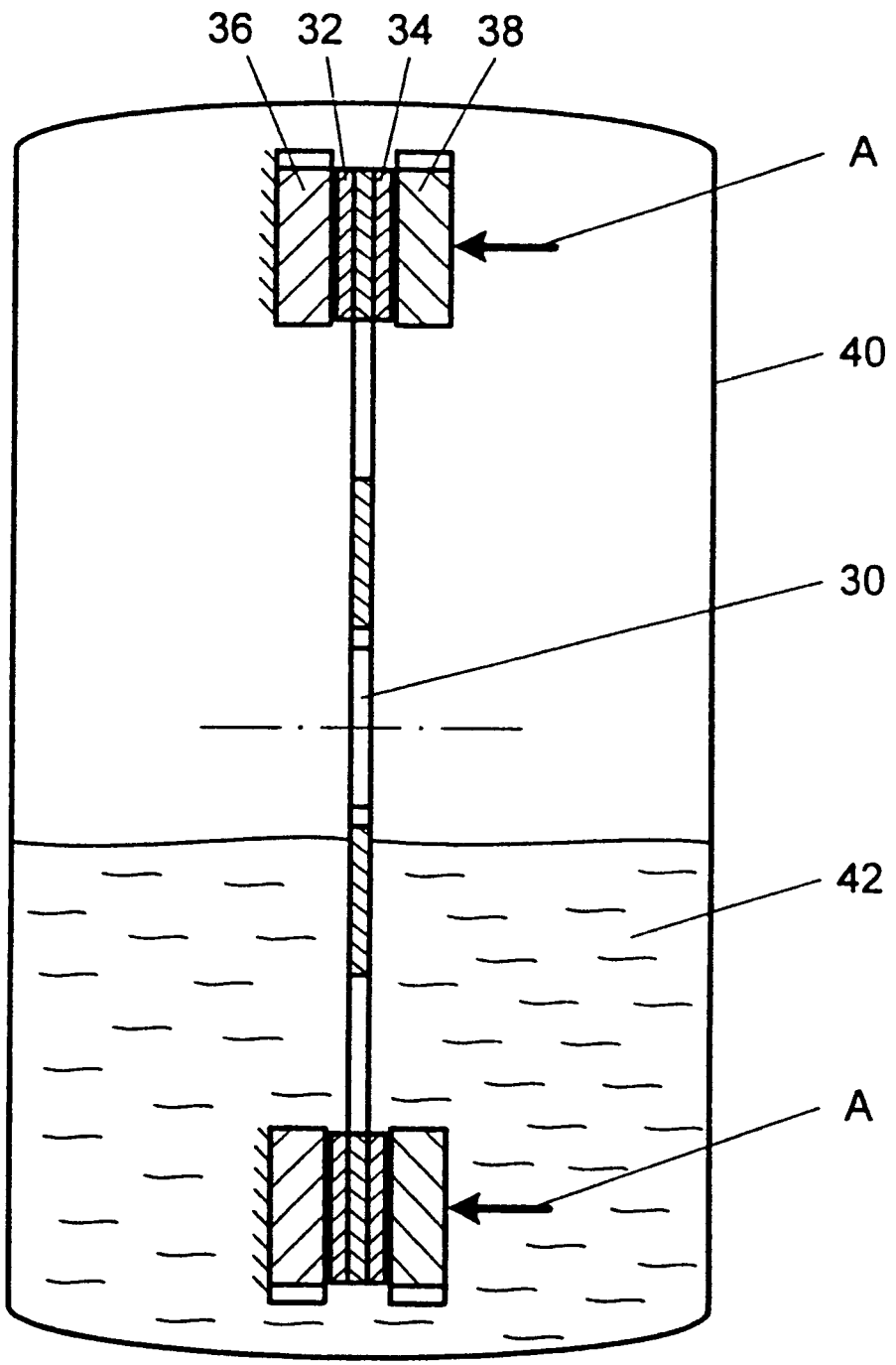
FIG. 3 shows the cross sectional representation of a service brake.

FIG. 3 discloses a service brake with a brake disk which is arranged, fixed against rotation, on a shaft, not shown in any further detail, of the driveline, in particular in the region of the wheel axles. The brake disk is configured as a generally disk-shaped steel support 30 to whose radially outer regions ring-shaped brake linings 32, 34 are applied to both sides with adhesive. Here, too, the linings may be HM200E of the company Miba, Austria. In place of the ring-shaped brake linings 32, 34 several brake lining segments could be fastened to each side of the steel support 30.

On both sides of the brake disk each of the brake linings 32, 34 is opposed by a metal ring 36, 38 with a contact surface facing the brake lining. The metal rings 36, 38 consist of aluminum or an aluminum alloy, for example, of AlSi9Cu3. The metal ring 36, shown at left in FIG. 3, is stationary and connected to the brake housing 40. The metal ring 38, at the right, is secured against rotation and can be moved in the usual manner by a hydraulic piston, not shown, in the axial direction (arrow A).

In the embodiment according to FIG. 3, the elements of the brake are also located in a closed housing, which is partially filled with hydraulic oil 42, so that at least the brake linings 32, 34 of the brake disk are partially submerged in the hydraulic oil and are moistened by it.

Upon braking, the right metal ring 38 is pressed axially to the left in the direction of the arrow so that the brake linings 32, 34 of the brake disk are clamped between the left metal ring 36 and the right metal ring 38. The friction engagement between the resting metal rings 36, 38 and the rotating brake linings 32, 34 leads to the braking of the shaft of the driveline add thereby to the braking of the vehicle.

FIG. 3 shows generally a rotating brake disk with brake linings 32, 34 and two associated stationary metal rings 36, 38. It is also possible to arrange several brake disks with brake linings each of which is associated with metal rings, in a package, as is usual practice in multiple disk clutches for vehicles. In place of the stationary metal rings, shown in FIG. 3, these may be arranged to be free to rotate and to interact with associated stationary brake linings.

Although the invention has been described in terms of only a few embodiments, anyone skilled in the art will perceive many varied alternatives, modification and variations in the light of the above description as well as the drawing, all of which fall under the present invention. In that way for example, the selection of the material of the brake drum and the friction ring as well as the selection of the material of the brake band with its friction lining is not limited to the materials described.

What is claimed is:

1. A friction engagement device for motor vehicles comprising at least one first component (10) and at least one second component (16, 18) that can be moved relative to each, other, where the first component (10) is provided with at least one contact surface, and, at least in its region bordering on the contact surface, comprises an aluminum alloy containing between 5–14% silicon and 0–5% copper, where the second component contains a support component (16) provided with a friction lining (18) engagable with the contact surface wherein the friction lining (18) is an organic material of predominately carbon compounds and one of the first and second components rotates at least partially in a lubricant.

2. The device according to claim 1 wherein the friction lining (18) is comprised essentially of paper.

3. The device according to claim 1 wherein the friction coefficient is greater than 0.1.

4. The device according to claim 1 wherein the lubricant is a lubricating oil.

5. The device according to claim 1 wherein the friction lining is made primarily of fibers and synthetic thermally stable fibers bound in a resin.

6. The device according to claim 1 wherein the aluminum or aluminum alloy has a thermal conductivity that is greater than 120 W/m°K.

7. The device according to claim 1 wherein the first component is made of an aluminum alloy AlSi9Cu3.

8. The device according to claim 1 wherein the contact surface of the first component (10) is subjected to a surface treatment by hard anodizing.

9. The device according to claim 1 wherein the first component is a brake drum (10).

10. The device according to claim 9 wherein the brake drum (10) is configured as a composite component having a supporting structure (24) predominately of iron and a friction element (26) of aluminum or an aluminum alloy fixed thereto forming the contact surface.

11. The device according to claim 1 wherein the second component is a rotating brake disk that carries at least one brake lining (32, 34) on both sides in its radial outer region, and that the brake linings (32, 34) are associated with non-rotating first components (36, 38) with contact surfaces, where at least one component (38) can be moved axially in order to establish the friction engagement between the brake lining (32, 34) and the contact surface.

* * * * *